(12) United States Patent
Xu et al.

(10) Patent No.: US 10,898,886 B2
(45) Date of Patent: Jan. 26, 2021

(54) HYDROCARBON AND NITROGEN OXIDES CATALYST TRAP

(71) Applicant: FORD GLOBAL TECHNOLOGIES, LLC, Dearborn, MI (US)

(72) Inventors: Lifeng Xu, Northville, MI (US); Giovanni Cavataio, Dearborn, MI (US); Justin Anthony Ura, Livonia, MI (US); Jeffrey Scott Hepburn, Birmingham, MI (US); Gang Guo, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 617 days.

(21) Appl. No.: 15/248,223

(22) Filed: Aug. 26, 2016

(65) Prior Publication Data
US 2018/0056282 A1 Mar. 1, 2018

(51) Int. Cl.
| | |
|---|---|
| *B01J 29/06* | (2006.01) |
| *B01J 29/74* | (2006.01) |
| *F01N 3/08* | (2006.01) |
| *B01D 53/94* | (2006.01) |
| *F01N 13/00* | (2010.01) |
| *B01J 35/00* | (2006.01) |
| *B01J 37/02* | (2006.01) |
| *B01J 20/18* | (2006.01) |
| *B01J 29/068* | (2006.01) |
| *B01J 37/30* | (2006.01) |
| *F01N 3/10* | (2006.01) |
| *F01N 3/28* | (2006.01) |
| *B01J 29/44* | (2006.01) |
| *B01J 29/12* | (2006.01) |

(52) U.S. Cl.
CPC ........ *B01J 29/7415* (2013.01); *B01D 53/945* (2013.01); *B01D 53/9486* (2013.01); *B01J 20/18* (2013.01); *B01J 20/186* (2013.01); *B01J 29/068* (2013.01); *B01J 35/0006* (2013.01); *B01J 37/0201* (2013.01); *B01J 37/0209* (2013.01); *B01J 37/0246* (2013.01); *B01J 37/30* (2013.01); *F01N 3/0814* (2013.01); *F01N 3/101* (2013.01); *F01N 3/2825* (2013.01); *F01N 13/0093* (2014.06); *F01N 13/0097* (2014.06); *B01D 2255/1023* (2013.01); *B01D 2255/50* (2013.01); *B01D 2255/502* (2013.01); *B01D 2255/504* (2013.01); *B01D 2255/91* (2013.01); *B01D 2255/912* (2013.01); *B01J 29/126* (2013.01); *B01J 29/44* (2013.01); *B01J 29/743* (2013.01); *B01J 2229/186* (2013.01); *B01J 2229/20* (2013.01); *B01J 2229/37* (2013.01); *F01N 2370/04* (2013.01); *Y02T 10/12* (2013.01)

(58) Field of Classification Search
CPC ........ B01J 29/068; B01J 29/126; B01J 29/44; B01J 29/7415; B01J 29/743; B01J 2229/37; B01J 2229/186; B01J 35/0006; B01J 37/30; B01J 37/0246; B01J 37/0209; B01J 37/0201; B01J 20/18; B01J 20/186; B01J 20/126; B01D 53/945; B01D 53/9486; B01D 2255/91; B01D 2255/912; B01D 2255/50; B01D 2255/502; B01D 2255/504
USPC .... 502/4, 60, 74, 77, 79, 65, 64, 63, 66, 69, 502/71, 400, 407, 414, 415
See application file for complete search history.

(56) References Cited

U.S. PATENT DOCUMENTS

| | | | |
|---|---|---|---|
| 5,776,417 A | 7/1998 | Frost et al. | |
| 6,074,973 A | 6/2000 | Lampert et al. | |
| 6,080,375 A | 6/2000 | Mussmann et al. | |
| 6,093,378 A * | 7/2000 | Deeba .................. | B01D 53/945 423/213.5 |
| 7,756,031 B2 | 7/2010 | Holloway et al. | |
| 8,906,329 B2 | 12/2014 | Ballinger et al. | |
| 9,120,056 B2 | 9/2015 | Cavataio et al. | |
| 2007/0129236 A1 | 6/2007 | Liu et al. | |
| 2008/0124514 A1* | 5/2008 | Fujdala ................ | B01D 53/945 428/116 |
| 2015/0118119 A1 | 4/2015 | Change et al. | |
| 2015/0158023 A1 | 6/2015 | Rajaram et al. | |

FOREIGN PATENT DOCUMENTS

| | | |
|---|---|---|
| CN | 1096712 A | 12/1994 |
| CN | 1197686 A | 11/1998 |
| CN | 101618323 A | 1/2010 |
| CN | 105682792 A | 6/2016 |
| JP | H06198133 A | 7/1994 |
| JP | H119999 A | 1/1999 |

OTHER PUBLICATIONS

Navlani-Garcia et al., "CuH—ZSM-5 as Hydrocarbon Trap under cold start condidtions", Environ Sci. Technol. 2016, 11, pp. 5851-5857.*
Choi, Byung-Chul et al., "State of the Art of de-NOx Technology Using Zeolite Catalysts in Automobile Engines", J. Ind. Eng. Chem., vol. 11, No. 1 (2005) pp. 1-9.

* cited by examiner

*Primary Examiner* — Elizabeth D Wood
(74) *Attorney, Agent, or Firm* — Geoffrey Brumbaugh; Brooks Kushman P.C.

(57) ABSTRACT

A hydrocarbon and NOx catalyst trap includes a three-way catalyst, and a zeolite layer adjacent to the three-way catalyst and including alumina and silica arranged to form a repeating skeletal frame that defines cavities including active metal active sites for hydrocarbon and NOx trapping such that individual atoms of the active metal are bound to the frame within the cavities via oxygen atoms.

20 Claims, 3 Drawing Sheets

US 10,898,886 B2

HYDROCARBON AND NITROGEN OXIDES CATALYST TRAP

TECHNICAL FIELD

The disclosure relates to an automotive catalyst trap designed to reduce cold start emissions and a method of producing the same.

BACKGROUND

Reduction of tailpipe emissions is a challenging goal in the automotive industry. As the acceptable values for tailpipe emissions continue to decrease, technologies must continually improve to meet the standards. Many efforts have been focused on reduction of hydrocarbon (HC) and mononitrogen oxides NO and $NO_2$ (NOx) cold start emissions or emissions produced during the first several minutes after a vehicle is started. The traditional approaches to reducing cold start HC and NOx emissions include development of catalysts capable of warming up quickly and lighting-off at lower temperatures as well as optimizing engine cold start conditions to deliver heat to the catalyst as quickly as possible. However, even with very fast catalyst light-off, there are generally at least tens of seconds during cold start when the catalyst is not warm enough to convert any HC and/or NOx species.

SUMMARY

In at least one embodiment, a hydrocarbon and NOx catalyst trap is disclosed. The catalyst trap includes a three-way catalyst and a zeolite layer adjacent to the three-way catalyst. The zeolite layer includes alumina and silica arranged to form a repeating skeletal frame that defines cavities including active metal active sites for hydrocarbon and NOx trapping such that individual atoms of the active metal are bound to the frame within the cavities via oxygen atoms. The zeolite layer may include BEA, ZSM5, Y, chabazite, or a combination thereof, with silica to alumina ratio of 10 to 100. The zeolite layer, with the active metal loading of about 0.4 wt. % active metal, may be configured to store up to about $20.5 \times 10^{-6}$ mole of ethylene per 0.5 g thereof. The zeolite layer, with the active metal loading of about 0.4 wt. % active metal, may be configured to store up to $7.7 \times 10^{-6}$ mole of NOx per 0.5 g thereof. The active metal may be palladium, platinum, ruthenium, rhodium, or a combination thereof. The zeolite layer may be configured to hold trapped NOx up to a temperature of about 250° C. The active metal loading may be about 0.1 to 1 wt. %. The active metal may be ion-exchanged. The active metal may be incorporated via a zeolite in-situ active metal powder addition.

In another embodiment, a method of producing a hydrocarbon and NOx catalyst trap is disclosed. The method includes mixing a first solution comprising water, tetraethylammonium hydroxide, sodium chloride, potassium chloride, and silica with a second solution comprising water, sodium hydroxide, and sodium aluminate while adding a third solution of an active metal nitrate to form a zeolite in-situ active metal gel. The method may further include heating the gel. The method may also include reclaiming a zeolite in-situ active metal powder by vacuum filtering the gel. The method may further include removing sodium and unexchanged active metal from the zeolite in-situ active metal powder by washing the powder with water and vacuum filtering. The method may further include drying the zeolite in-situ active metal powder and calcining the dried powder. The method may also include removing sodium from the calcined powder by ion-exchange with ammonium nitrate at least one time. The active metal nitrate may be palladium (II) nitrate. The zeolite in-situ active metal powder may include BEA, ZSM5, Y, chabazite, or a combination thereof.

In an alternative embodiment, a method of producing a hydrocarbon and NOx catalyst trap by ion-exchange is disclosed. The method may include forming an exchange solution by mixing an active metal nitrate solution with water. The method may further include adding an unexchanged zeolite powder to the exchange solution after an exchange temperature is reached under constant stirring and while maintaining pH of about 2 to 3. The method may also include vacuum filtering the exchange solution to reclaim zeolite ion-exchanged active metal powder. The active metal nitrate may be palladium (II) nitrate. The exchange solution may have an active metal concentration of about $1 \times 10^{-4}$ g active metal/g solution to $20 \times 10^{-4}$ g active metal/g solution. The method may include removing unexchanged active metal from the powder by washing the powder with water and vacuum filtering the powder. The unexchanged zeolite powder may include BEA, ZSM5, Y, chabazite, or a combination thereof.

DETAILED DESCRIPTION

Figure 1:
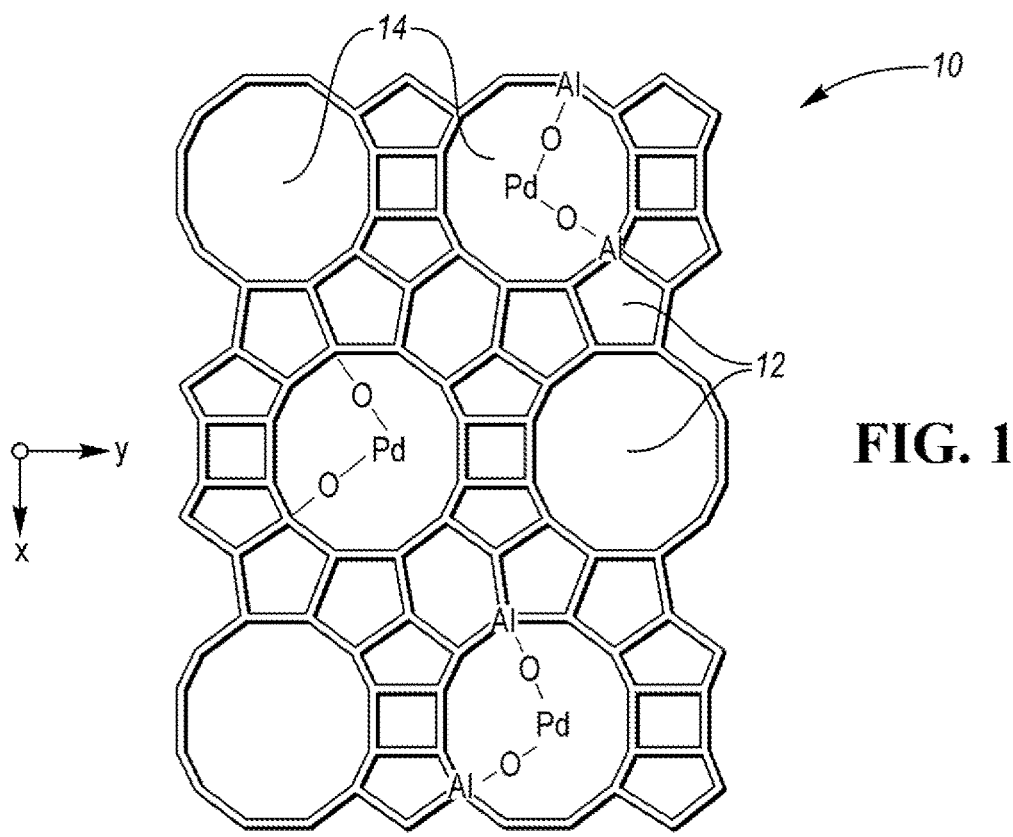
FIG. 1 depicts a projection of a portion of BEA zeolite framework structure.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

As the demand for environmentally-conscious technologies grows, regulations regarding the automotive emissions are becoming increasingly more stringent. An example classification for passenger vehicle emissions is Super Ultra-Low Emission Vehicle SULEV20 and SULEV30. The SULEV classification is based on producing 90% less emissions than an equivalent gasoline-powered vehicle. The SULEV vehicles are thus 90% cleaner than the average new vehicle for the model year. To comply with the SULEV and similar classifications, various strategies have been implemented. For example, since the cold start HC emission remains a challenge, focusing on reduction of the cold start emissions may increase overall reduction of tailpipe emissions. Cold start emissions relate to the emissions of gasoline and diesel passenger vehicles which are not reduced by catalysts during a warm-up phase of the vehicle. Catalysts require a certain temperature, typically above 300° C., to work efficiently. Before the engine reaches the temperature sufficient to warm the catalyst after a vehicle is started, emissions are not being reduced and thus represent a significant portion of overall tailpipe emissions. The duration of the cold start period and the overall emissions produced during this phase depend on the ambient temperature, the type of fuel used, the initial temperature of the vehicle's propulsion system, and other factors.

A traditional approach to reducing the cold start HC and NOx emissions includes development of catalysts capable of warming up quickly and lighting-off at relatively low temperatures as well as optimizing the engine cold start condition to heat up the catalysts fast. However, a time window of about 20 to 40 seconds at the beginning of the cold start remains. During this window, the catalyst is not hot enough to convert the HC and NOx species. As a result, about 95% of tailpipe non-methane hydrocarbon (NMHC) emissions of a current vehicle in FPT75 emission test cycle releases during the cold start. This places a higher demand on an overall reduction of the total tailpipe NMHC emissions for a vehicle which is to meet particular emissions standards.

One of the alternative approaches to reducing cold start HC and NOx emissions is the application of a HC and NOx trap catalyst. The main idea behind a HC and NOx trap is adsorbing HCs and NOx during cold start, when the catalyst is cold and not active, and releasing and converting the trapped HC and NOx when the catalyst warms up after the cold start period ends. The effectiveness of the HC and NOx trap in reducing cold start emissions depends on the trap's capacity to store HCs and NOx at cold start and on the release temperatures of the trapped HCs and NOx. The more HCs and NOx the trap can adsorb during cold start and the higher the release temperature, the more cold start HCs and NOx can be converted by the HC and NOx trap catalyst. A typical HC and NOx trap can convert up to about 30 to 40% of the cold start NMHC. Thus, it would be desirable to identify ways how to convert a higher percentage of the cold-start HCs and NOx to meet more stringent emission standards.

A typical HC and NOx trap catalyst includes two main components: HC and NOx trapping material and a three-way catalyst (TWC). Various HC and NOx trapping materials have been identified. Zeolites have proven to be very useful and effective trapping components of a HC and NOx trap. The type of zeolites, and the way they are modified with an active metal, significantly impacts their HC and NOx trapping efficiency, release temperature, and overall conversion efficiency.

Zeolites are microporous aluminosilicate minerals including interlinked tetrahedra of alumina ($AlO_4$) and silica ($SiO_4$). Zeolites occur naturally, but are also produced industrially. Examples of the naturally-occurring zeolites include analcime, chabazite, clinoptilolite, heulandite, natrolite, stilbite, etc. Industrial preparation of zeolites allows for creation of precise and unique frameworks of zeolites. Tailoring of the synthetic zeolites, for example designing the pore size, thus provides several advantages over their naturally-occurring analogs.

As can be seen in FIG. 1, zeolites have a very regular porous crystalline three-dimensional framework structure 10 of molecular dimensions. The basic zeolite framework 10 is built from aluminum, oxygen, and silicon. The pore 12 structure is capable of accommodating a wide variety of cations such as alkaline-Earth metals (sodium, potassium, magnesium), which may be trapped within the pores 12, and which may be exchanged for other cations via ion-exchange. Zeolites are also called "molecular sieves," referring to their ability to selectively sort molecules based primarily on size exclusion. The framework 10 of a zeolite forms a number of channels 14 extending throughout the framework structure 10. The dimensions and orientation of the channels 14 determine the maximum size of a molecular or ionic species that can enter the pores 12 of the zeolite. The shape, size, and composition of the zeolite thus determine its properties including an ability to capture certain species of HCs and NOx.

Therefore, the type of the trapping zeolite material determines the HC and NOx species the trap is capable of capturing and holding. Certain cold-start HCs and NOx may not be trapped by every trapping material. For example, certain HC species and NOx may have dimensions exceeding the maximum size of the channels 14 and may not be able to enter the zeolite channels 14. Alternatively, the orientation of the zeolite channels 14 may not be conducive to allow entry of certain HC and NOx species. These HC and NOx species may thus have almost zero trapping function and conversion.

Depending on the type of fuel used by the engine, speciation of the HCs differs. For example, HC profiles of E10 (Ethanol 10%) and E85 (Ethanol 85%) are significantly different. The cold-start HC profile for E10 includes iso-pentane, toluene, ethylene, and propylene, among other species. The HC profile for E85, on the other hand, includes ethanol, ethylene, iso-pentane, and acetaldehyde, as main contributors. The six most significant NMHC species during the cold start are 2-methylbutane, acetaldehyde, ethanol, ethylene, propylene, and toluene.

Figure 2:
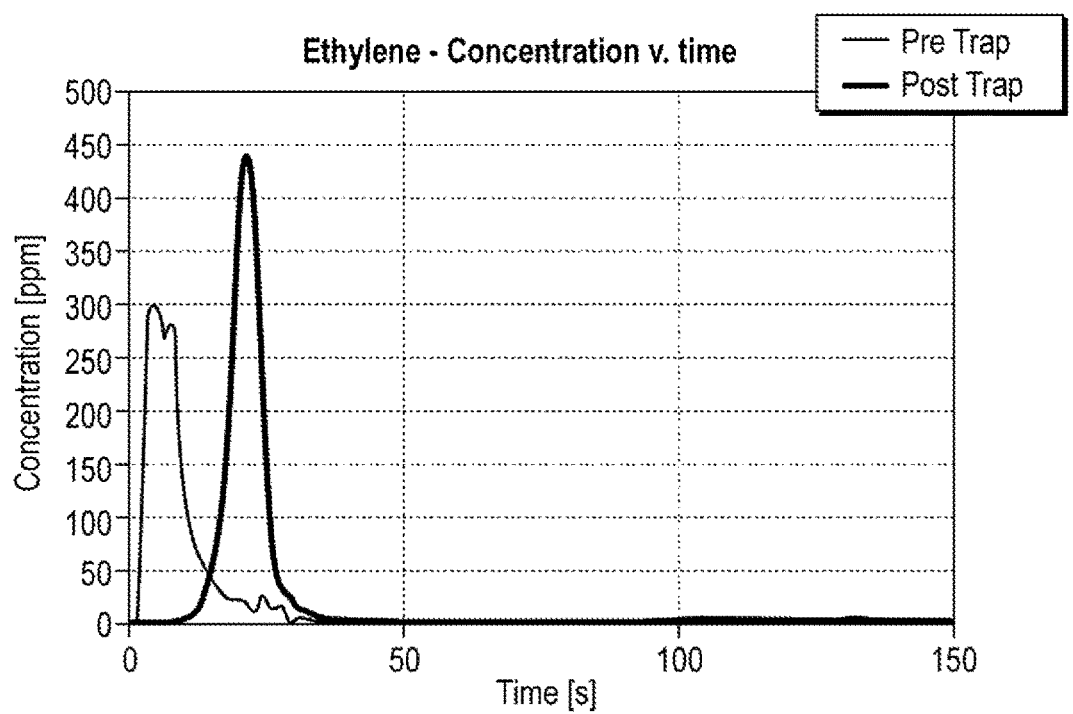
FIG. 2 shows a plot of ethylene emission concentration versus time measured pre- and post-conventional HC trap during cold start.

The trapping material thus should be tailored to enable trapping of the relevant species of the fuel to be used by the engine. One of the most difficult species to reduce during the cold start is ethylene. Ethylene accounts for about 14% of the total pre-trap emissions. Yet, a conventional trap is not capable of significantly reducing ethylene. FIG. 2 illustrates ethylene concentration versus time measured pre- and post-HC conventional trap during cold start. No cold start ethylene was converted by the conventional HC trap. As a result, a post-HC trap ethylene percentage may be as high as 63% of all NMHC emissions. Thus it would be desirable to provide a catalyst trap which would be capable of improving cold start HC emissions by reducing the amount of ethylene during cold start.

Figure 3:
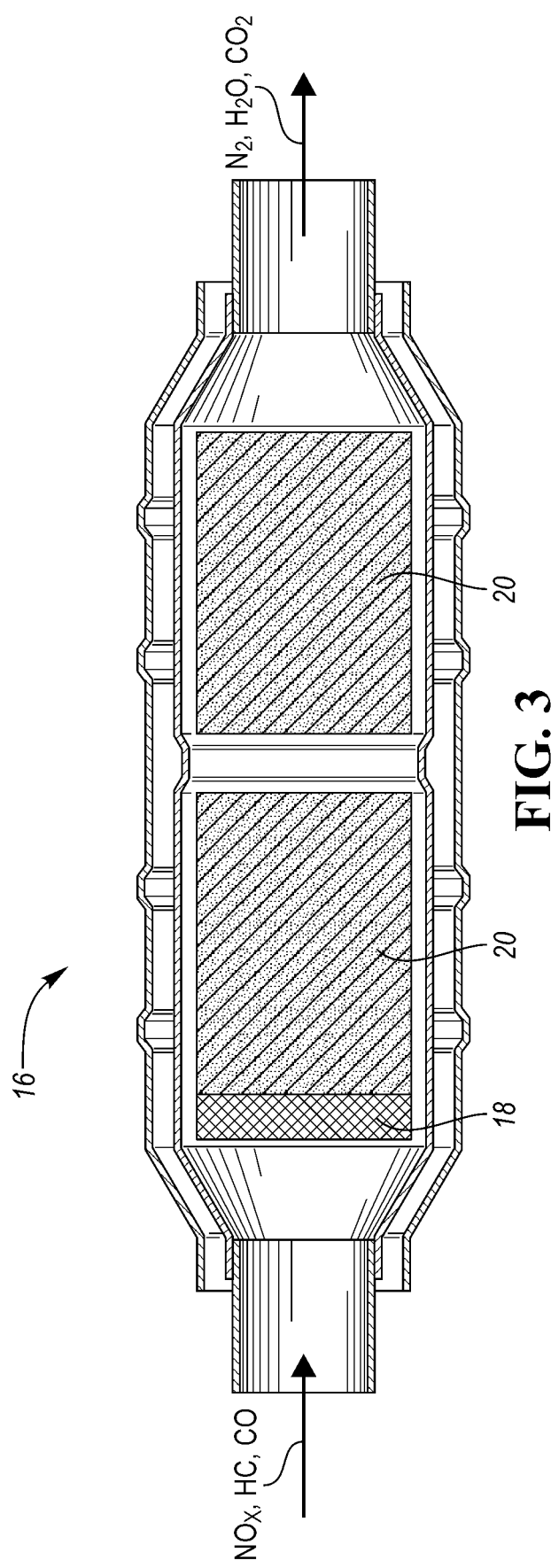
FIG. 3 shows a schematic view of an example catalytic converter according to one or more embodiments.

In one or more embodiments of the current disclosure, a catalytic converter 16 is disclosed which is capable of trapping and converting NOx and HCs including ethylene. The catalytic converter 16, an example of which is schematically depicted in FIG. 3, includes a catalyst trap 18 including one or more different types of modified zeolites. The trap 18 may include one or more layers of zeolite material. The trap 18 may be located downstream from the TWC 20 containing a reduction catalyst designed to eliminate NOx and an oxidation catalyst to eliminate CO and unburned HCs. The TWC 20 may include catalytic active material such as aluminum oxide $Al_2O_3$, cerum oxide $CeO_2$, rare earth stabilizers, precious metals such as Pt, Pd, Rh, the like, or a combination thereof. The catalytic converter 16 and the dimensions and orientation of the depicted layers 18, 20 is just schematic to illustrate the main direction of the exhaust gas flow.

The catalyst trap 18 may utilize one or more different types of zeolite material configured into one or more layers. For example, the trap 18 may include 1 to 20 layers, 5 to 15 layers, or 7 to 10 layers. The layers may have the same or different dimensions, structure, orientation, or a combination thereof. For example, thickness of all of the layers may be the same. Alternatively, at least one layer may have a different thickness than another layer. Alternatively still, a first layer located closest to the gas inlet may have a thickness $t_1$, an adjacent layer may have a thickness $t_2$, the third layer may have a thickness $t_3$, the fourth layer may have a thickness $t_4$, and so on. Alternatively, the thickness of the layers may increase in the direction from the gas inlet to the gas outlet or vice versa. All the layers may have the same or different composition. Each layer may contain a different type of zeolite(s). Alternatively, the same type of zeolite(s) may be included in all of the layers. Specifically, the catalyst trap 18 may include BEA, ZSM5, Y, chabazite, or a combination thereof.

BEA, or a Beta polymorph A, zeolite is depicted in FIG. 1. The BEA zeolite has the following characteristics. The largest cavity diameter is 6.9 Å; the pore limiting diameter is 6.7 Å. Cell parameters of the BEA framework are as follows: a=12.632 Å, b=12.632 Å, c=26.186 Å. This translates into the maximum diameter of a molecule that can be trapped by BEA to 6.68 Å and that can diffuse along a, b, and c to 5.95 Å. The framework density is 15.3 T/1000 Å$^3$. Accessible and occupiable volume of the BEA framework is about 20.52%, which translates into 857.32 Å$^3$. The occupiable volume means the portion of the available volume within the cell that can be visited by the center of a spherical water molecule having a radius of about 1.4 Å. The available volume is the unit cell volume remaining after the van der Waals atomic sphere volumes are subtracted. The accessible volume relates to the portion of the occupiable volume that has continuity between all unit cells. Some pores have openings that are too small to allow the water molecule access and so represent isolated occupiable regions. The occupiable area or an area of the surface visited by the center of the water molecule is 779.37 Å$^2$ or 1220.55 m$^2$/g. The composite building units of the BEA framework are mor (t-tes), bea, and mtw (t-mtw). The Periodic Building Unit in the tetragonal BEA includes T16 units: 4 fused 6-rings or 8 fused 5-rings related by pure translations along the cell edges a and b.

ZSM-5, or Zeolite Socono Mobile-5, is a synthetic pentasil-zeolite composed of several pentasil units linked together by oxygen bridges to form pentasil chains. A pentasil unit includes 8 5-membered rings, where the vertices are Al or Si bonded by O. ZSM-5 has an MFI framework type which has the following characteristics. Cell parameters of the MFI framework are: a=20.090 Å, b=19.738 Å, c=13.142 Å. This translates into the maximum diameter of a molecule that can be trapped by MFI to 6.36 Å and that can diffuse along a, b, and c to 4.46-4.70 Å. The framework density is 18.4 T/1000 Å$^3$. Accessible and occupiable volume of the MFI framework is about 9.81%, which translates into 511.01 Å$^3$. The composite building units of the MFI framework are mor (t-tes), cas, and mfi (t-pen).

Zeolyte Y, or faujasite, has a three-dimensional pore structure with pores running perpendicular to each other. Y zeolite is made from secondary building units 4, 6, and 6-6. The pore diameter is large at 7.4 Å since the aperture is defined by a 12-member oxygen ring and leads into a larger cavity of diameter 12 Å. The cavity is surrounded by ten sodalite cages (truncated octahedra) connected on their hexagonal faces. Zeolite Y has FAU structure which has the following characteristics. Cell parameters of the FAU framework are: a, b, c=24.345 Å. This translates into the maximum diameter of a molecule that can be trapped by FAU to 11.24 Å and that can diffuse along a, b, and c to 7.35 Å. The framework density is 13.3 T/1000 Å$^3$. Accessible and occupiable volume of the FAU framework is about 27.42%, which translates into 4,128.07 Å$^3$. The composite building units of the FAU framework are d6r (t-hpr) and sod (t-toc).

Chabazite may be a natural or synthetic zeolite. For example, chabazite may be a synthetic zeolite with a CHA framework having the following characteristics. Cell parameters of the CHA framework are as follows: a=13.675 Å, b=13.675 Å, c=14.767 Å. This translates into the maximum diameter of a molecule that can be trapped by CHA to 7.37 Å and that can diffuse along a, b, and c to 3.72 Å. The framework density is 15.1 T/1000 Å$^3$. Accessible and occupiable volume of the CHA framework is about 17.27%, which translates into 413.35 Å$^3$. The composite building units of the CHA framework are d6r (t-hpr) and cha (t-cha).

Any of the zeolites named above may have silica to alumina ratio (SAR) between about 10 to about 100. For example, the zeolite may be BEA 24, with the numeral referring to SAR. Generally, the higher the SAR, the more stable but less active the zeolite is.

The zeolite may be modified with a transition metal or precious metal, hereinafter referred to as an active metal. The modification with the active metal is provided to improve HC and NOx adsorption and desorption performance. The active metals may be transition and precious metals such as Pd, Pt, Ru, Rh, Cu, Ni, Fe, Mn, or the like. The amount of the active metal included may be from about 0.05 to 3.5 wt. %, from 0.1 to 2 wt. %, or from 0.5 to 1 wt. %.

It has been unexpectedly discovered that the modified zeolite prepared by the methods described herein is capable of an improved adsorption of ethylene when compared to non-modified zeolite. The net ethylene stored in the modified zeolite trap disclosed herein may be up to three times the amount of the amount of ethylene storable in a typical zeolite trap. Specifically, the herein disclosed modified zeolite trap is capable of storing up to about $20.5 \times 10^{-6}$ mole of ethylene per 0.5 g/zeolite.

Figure 4:
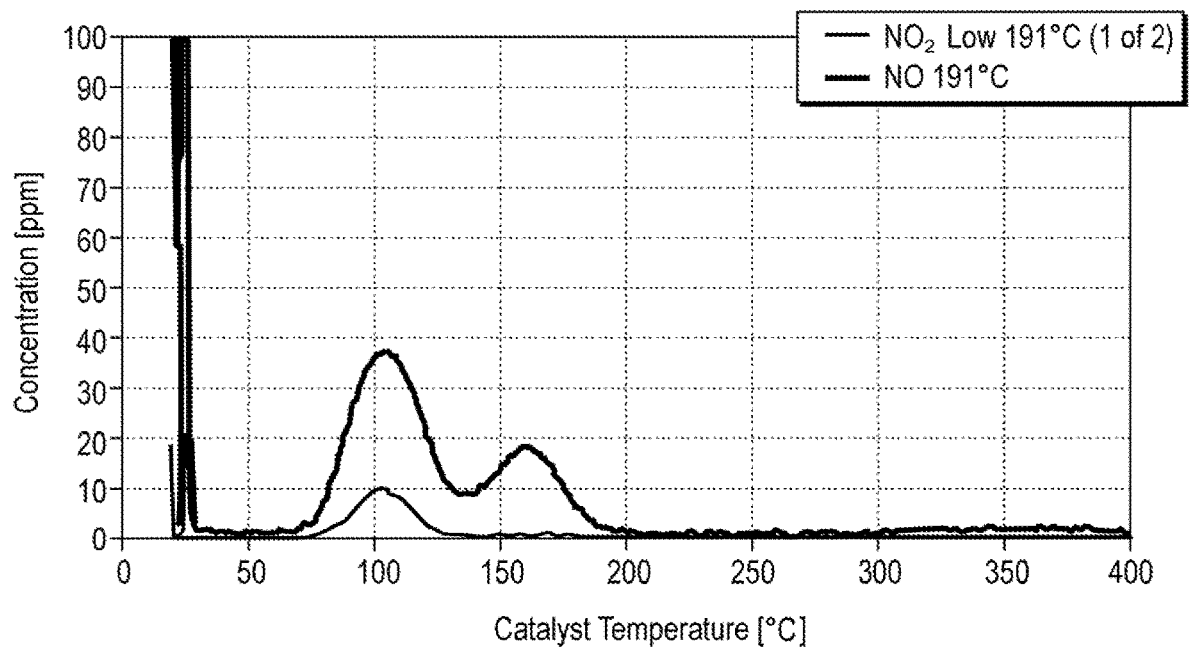
FIG. 4 depicts a plot of NOx emissions concentration versus temperature of BEA zeolite impregnated with 0.5 wt. % Pd.

Likewise, NOx storage of the modified zeolite trap is improved by about 50%, and the release temperature of NOx is higher when compared to a conventional zeolite trap. The modified zeolite trap is capable of storing up to about $7.7 \times 10^{-6}$ mole of NOx per 0.5 g/zeolite. FIG. 4 shows a plot of NOx release temperature of a typical zeolite trap having BEA zeolite with 0.5 wt. % Pd loading, where Pd was inserted via impregnation. The NOx release temperature is below 200° C., specifically about 105° C. and 160° C. Such temperatures are insufficient for NOx conversion, and NOx thus passes through the trap and converter unconverted.

Figure 5:
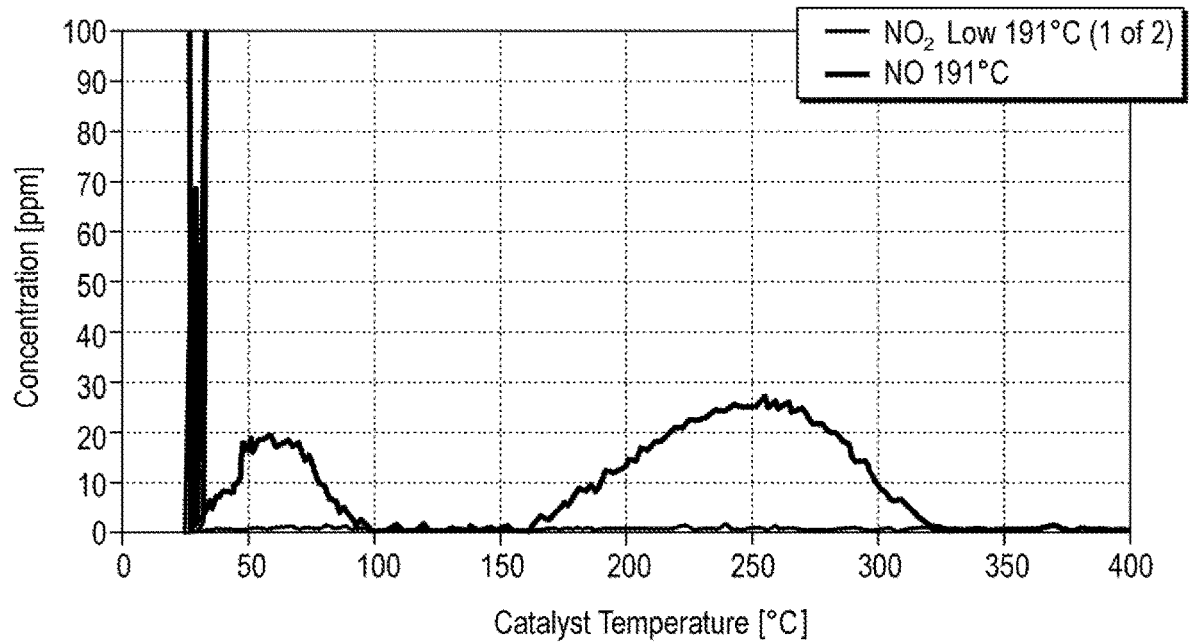
FIG. 5 depicts a plot of NOx emissions concentration versus temperature of BEA zeolite ion-exchanged to have 0.5 wt. % Pd loading.

In contrast, as can be seen in FIG. 5, a plot depicting NOx release temperature of the presently disclosed trap, the NOx release temperature is from about 200° C. to about 250° C., at which point the catalytic converter is heated enough to convert NOx instead of just passing NOx in an unconverted form through the converter.

Without limiting the disclosure to a single theory, it is presumed that the reason for the higher NOx release temperature, NOx storage volume, and ethylene storage volume of the present trap lies in an effective dispersion of the active metal within the zeolite cavities. Such dispersion is achievable by the method described below and results in a dispersion of the active metal as separate atoms in the zeolite cavities. Such dispersion results in a higher amount of active sites within the zeolite than is achievable by other zeolite modification methods such as impregnation or mixing methods.

Without such dispersion, the active metal forms agglomerations. The agglomerations may prevent some of the active metal atoms from participating in the trapping reactions as the atoms may be within the agglomeration, and thus not having access to the incoming HCs and NOx. Furthermore, if the agglomerations are too large, the agglomerations tend to leave the cavity and attach on the outside of the skeletal frame. The richer or more reducing the environment is, the more is the active metal prone to form agglomerations. Thus, if the active metal is initially provided by impregnation or mixing methods, presence of the agglomerations lowers the ability to trap HCs and NOx from the beginning and lessens further in the reducing environment. As the agglomerations increase in size and move closer to the periphery of the zeolite cavity, recovery of the active metal becomes more difficult as the individual atoms of active metal become irreversibly bonded together. Once the active metal agglomerations attach to the outside of the cavity, recovery of the active metal is not possible, which negatively impacts trapping efficiency of the converter.

Dispersion of the active metal within the cavities achieved by the methods described herein ensures that active metal agglomerations are non-existent or minimized prior to converter use, and are only minimal during the converter lifetime. As FIG. 1 shows, a zeolite framework of the present disclosure including alumina and silica is arranged to from a skeletal framework defining cavities. The active metal is bound to the frame within the cavities via oxygen atoms. Depending on the diameter of the cavity and the size of the active metal atom, one or more bound active metal atoms may fit within the cavity or a pore 12. A schematic depiction of the active metal bonded to the skeletal frame 10 is depicted within example pores 12 in FIG. 1.

According to one or more embodiments, a method of producing active metal dispersed within the zeolite cavities and/or pores is disclosed. The method may incorporate the active metal via a zeolite in-situ active metal powder addition. The method may include multiple steps, at least some of which may be repeated once or more times.

The method may include mixing a first solution, a second solution, and a third solution. The first solution may include water, tetraethylammonium hydroxide, sodium chloride, potassium chloride, and silica. The second solution may include water, sodium hydroxide, and sodium aluminate. The third solution may include an active metal nitrate such as palladium (II) nitrate. The water may be deionized (DI) water. All of the components in each solution may be mixed together and stirred until dissolved. The method may include mixing the first and second solutions together along with the third solution to form a zeolite in-situ active metal gel. The mixing may include stirring lasting about 1 to 30 minutes, 5 to 20 minutes, or 10 to 15 minutes. The formed gel is subsequently heated. For the heating purposes, the gel may be placed in a container such as an autoclave. The autoclave may be a stainless steel autoclave. The autoclave may have a non-stick liner such as a Teflon™ liner. The autoclave may be sealed and placed in an oven for a period of time. The time period depends on the batch size, temperature, pressure, and other conditions. For example, the time period may be about 10 to 30 hours, 15 to 25 hours, or 20 to 23 hours at a temperature of about 100 to 150° C., 110 to 140° C., or 120 to 135° C. The gel may be subsequently vacuum filtered to reclaim the zeolite in-situ active metal powder on a vacuum filter. The vacuum filtering may be repeated once or multiple times while being washed with DI water between each filtering step to remove sodium and unexchanged active metal. The reclaimed powder may be dried for about 1 to 60 minutes, 20 to 50 minutes, or 30 to 40 minutes at a temperature of about 80 to 200° C., 100 to 180° C., or 120 to 140° C. before being removed from the vacuum filter. The dry powder may be placed in a container capable of withstanding high temperatures such as a ceramic crucible, and calcined. The calcination process may take about 12 to 36 hours at a temperature of about 500 to 700° C., 520 to 650° C., or 580 to 600° C. to at least partially decompose the organic and inorganic precursors.

The calcined powder may still contain a portion of sodium which may be removed by ion exchange with ammonium nitrate ($NH_4NO_3$). For example, the method may include adding the calcined powder to a solution of $NH_4NO_3$, and after the ion exchange, the powder may be washed with DI water and vacuum filtered at least one time and subsequently dried. The ion exchange procedure may be repeated at least once, twice, or more times.

Subsequently, the ion-exchanged powder may be calcined for about 30 minutes to 3 hours, 40 minutes to 2 hours, or 50 minutes to 1 hour, at a temperature referenced above regarding the calcination process, to remove stored ammonia and nitrates from the powder. The calcined ion-exchanged powder may be incorporated into a hydrocarbon and NOx catalyst trap disclosed herein. For example, the zeolite powder prepared by the described method may form one or more layers adjacent to the TWC.

An alternative method of providing dispersed active metal within the zeolite framework is disclosed. The method produces an ion-exchanged active metal. The method may include forming an exchange solution by mixing an active metal nitrate such as $Pd(NO_3)_2$ solution with DI water. The exchange solution may have an active metal concentration of about 1 to 20, 5 to 18, or 10 to $15 \times 10^{-4}$ g active metal/g solution. The exchange solution may be heated to a temperature which allows ion-exchange to take place. The temperature may be about 50 to 100° C., 60 to 90° C., or 75 to 80° C. Upon reaching the exchange temperature, an unexchanged zeolite powder is added to the exchange solution. The method may include adding the unexchanged zeolite powder under constant stirring for a period of time and/or while maintaining pH of about 1 to 4.5, 2 to 3.5, or 2.1 to 2.5. The pH may be adjusted at least once, for example by addition of a strong acid such as $HNO_3$. Alternatively, the maintenance of the pH may be provided by periodically measuring pH of the exchange solution, and periodically adjusting the pH of the exchange solution based on the results of the measurement. The period of time may be about 30 minutes to 3 hours, 40 minutes to 2 hours, or 50 minutes to 1 hour.

Subsequently, the exchange solution may be vacuum filtered to reclaim a zeolite ion-exchanged active metal powder. Vacuum filtering may be conducted once or several times while washing the powder in between each filtering, to remove any unexchanged active metal. The powder may be subsequently dried and calcined, as was described above, to decompose stored nitrates. The powder may be cooled to room temperature, and incorporated into a hydrocarbon and NOx catalyst trap disclosed herein. For example, the zeolite powder prepared by the described method may form one or more layers adjacent to the TWC.

EXAMPLES

Example 1

Example 1 was prepared according to the following method. The following components of a first solution: DI water, tetraethylammonium hydroxide (40 wt. % in $H_2O$), sodium chloride, and potassium chloride were added to a beaker and stirred until dissolved. Silica was then added and stirred for 10 minutes. A separate second solution was prepared by stirring of DI water, sodium hydroxide, and sodium aluminate until dissolved. The first and second solutions were added together along with a third solution—a stock solution of $Pd(NO_3)_2$ in $HNO_3$, and stirred for 10 minutes to form a gel.

The gel was transferred to a Teflon™ liner for a stainless steel autoclave. The Teflon™ liner was placed inside the stainless steel autoclave; the autoclave was sealed and placed in an oven for 20 hours at 135° C. The resultant solution was vacuum filtered to reclaim the powder. The powder was washed with DI water and vacuum filtered three times to remove as much Na and unexchanged Pd as possible. The powder was dried for 30 minutes at 140° C. and removed from the vacuum filter. The dry powder was placed in a ceramic crucible and calcined for 24 hours at 600° C. to decompose the beta template.

The remaining Na in the calcined powder was removed by ion exchange with $NH_4NO_3$. The powder was added to a 150 mL solution of 1.66 M $NH_4NO_3$ and stirred for 1.5 hours at 80° C. The pH was maintained at 4.5 by adding dilute $NH_4OH$ throughout the process. After the ion exchange, the powder was washed with DI water and vacuum filtered three times. The powder was dried for 30 minutes at 140° C. and removed from the vacuum filter. The exchange procedure was repeated two more times. After the ion exchanges, the powder was calcined for 1 hour at 600° C. to remove stored ammonia and nitrates. The elemental composition of the powder was analyzed by X-ray fluorescence (XRF) and it was found to contain 0.363 wt. % Pd.

Example 2

Example 2 was prepared according to the following method: 1.40 mL of stock $Pd(NO_3)_2$ solution (8.29 wt. % Pd in $HNO_3$) was added to 150 mL of DI water to generate an exchange solution with a Pd concentration of $9.89 \times 10^{-4}$ g Pd/g solution. The exchange solution was heated to the exchange temperature of 75° C. After reaching the exchange temperature, 7.00 g of unexchanged H-BEA24 powder was added to the solution under constant stirring. The solution was allowed to stir at 75° C. for 1 hour. The pH was maintained at 2.5 by periodically adding $HNO_3$.

After 1 hour, the solution was removed from heating and vacuum filtered to reclaim the powder. The powder was washed with DI water and vacuum filtered three times to remove any unexchanged Pd. The powder was dried for 30 minutes at 140° C. and removed from the vacuum filter. The dry powder was placed in a ceramic crucible and calcined for 1 hour at 600° C. to decompose stored nitrates.

After cooling to room temperature, 120 mg of powder was analyzed by XRF to determine its elemental composition, which was found to contain 1.58 wt. % Pd.

Example 3 and Comparative Example 1

Example 3 was prepared by ion exchange method described above with respect to Example 2 with Pd loading of 0.42 wt. % in 0.5 g of Example 3. Comparative Example 1 was prepared by a typical impregnation method. 0.5 g of Comparative Example 1 contained 0.5 wt. % Pd.

Both Example 3 and Comparative Example 1 were laboratory-aged for 25 hours at 750° C. Tests determining the amount of stored ethylene and NOx were conducted with a 30 second adsorption of 500 ppm ethylene or NOx of 250 ppm at room temperature (about 20 to 25° C.). Example 3 and Comparative Example 1 were then desorbed by heating up to 650° C. in a heating rate of 60° C. per minute. During the entire adsorption and desorption process, the water level was maintained at 10%. Table 1 below lists the test results.

TABLE 1

Comparison of the test results of ion-exchanged Pd and impregnated Pd in BEA 24

| Sample No. | Sample weight [g] | Method of zeolite modification | Pd loading [wt. %] | Total amount of stored ethylene ($\times 10^{-6}$ mole) | Total amount of stored NOx ($\times 10^{-6}$ mole) |
|---|---|---|---|---|---|
| Example 3 | 0.5 | ion-exchange | 0.42 | 20.58 | 7.73 |
| Comparative Example 1 | 0.5 | impregnation | 0.5 | 6.44 | 5.86 |

The net ethylene stored in Example 3 was about three times higher than in Comparative Example 1 (20.58 v. 6.44). The NOx storage was also improved by about 30% for Example 3 in addition to the benefit of much higher NOx release temperature in Example 3. The test results are also depicted in FIGS. 4 and 5. Specifically, FIG. 4 shows NOx release vs. temperature of Comparative Example 1 and FIG. 5 shows NOx release vs. temperature of Example 3. As was discussed above, Example 3 shows much higher release temperature than Comparative Example 1.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A hydrocarbon and NOx catalyst trap comprising:
   a three-way catalyst; and
   a zeolite layer adjacent to the three-way catalyst and including alumina and silica forming a repeating skeletal frame that defines cavities including active metal active sites for hydrocarbon and NOx trapping such that individual atoms of the active metal are bound to the frame within the cavities via oxygen atoms.

2. The trap of claim 1, wherein the zeolite layer comprises BEA, ZSM5, Y, chabazite, or a combination thereof, with silica to alumina ratio of 10 to 100.

3. The trap of claim 1, wherein the zeolite layer, with the active metal loading of about 0.4 wt. % active metal, is configured to store up to about $20.5 \times 10^{-6}$ mole of ethylene per 0.5 g thereof.

4. The trap of claim 1, wherein the zeolite layer, with the active metal loading of about 0.4 wt. % active metal, is configured to store up to $7.7 \times 10^{-6}$ mole of NOx per 0.5 g thereof.

5. The trap of claim 1, wherein the active metal is palladium, platinum, ruthenium, rhodium, or a combination thereof.

6. The trap of claim 1, wherein the zeolite layer is configured to hold trapped NOx up to a temperature of about 250° C.

7. The trap of claim 1, wherein the active metal loading is about 0.1 to 1 wt. %.

8. The trap of claim 1, wherein the active metal is ion-exchanged.

9. The trap of claim 1, wherein the active metal is incorporated via a zeolite in-situ active metal powder addition.

10. A method of producing the hydrocarbon and NOx catalyst trap of claim 1, the method comprising:
    mixing a first solution comprising water, tetraethylammonium hydroxide, sodium chloride, potassium chloride, and silica with a second solution comprising water, sodium hydroxide, and sodium aluminate while adding a third solution of an active metal nitrate to form a zeolite in-situ active metal gel;
    heating the gel; and
    reclaiming a zeolite in-situ active metal powder by vacuum filtering the gel.

11. The method of claim 10, further comprising removing sodium and unexchanged active metal from the zeolite in-situ active metal powder by washing the powder with water and vacuum filtering.

12. The method of claim 11, further comprising drying the zeolite in-situ active metal powder and calcining the dried powder.

13. The method of claim 12, further comprising removing sodium from the calcined powder by ion-exchange with ammonium nitrate at least one time.

14. The method of claim 10, wherein the active metal nitrate is palladium (II) nitrate.

15. The method of claim 10, wherein the zeolite in-situ active metal powder comprises BEA, ZSM5, Y, chabazite, or a combination thereof.

16. A method of producing the hydrocarbon and NOx catalyst trap of claim 1 by ion-exchange, the method comprising:
    forming an exchange solution by mixing an active metal nitrate solution with water;
    under constant stirring and while maintaining pH of about 2 to 3, adding an unexchanged zeolite powder to the exchange solution after an exchange temperature is reached; and
    vacuum filtering the exchange solution to reclaim zeolite ion-exchanged active metal powder.

17. The method of claim 16, wherein the active metal nitrate is palladium (II) nitrate.

18. The method of claim 16, wherein the exchange solution has an active metal concentration of about $1 \times 10^{-4}$ g active metal/g solution to $20 \times 10^{-4}$ g active metal/g solution.

19. The method of claim 16, further comprising removing unexchanged active metal from the powder by washing the powder with water and vacuum filtering the powder.

20. The method of claim 16, wherein the unexchanged zeolite powder comprises BEA, ZSM5, Y, chabazite, or a combination thereof.

* * * * *